United States Patent Office 3,512,453
Patented May 19, 1970

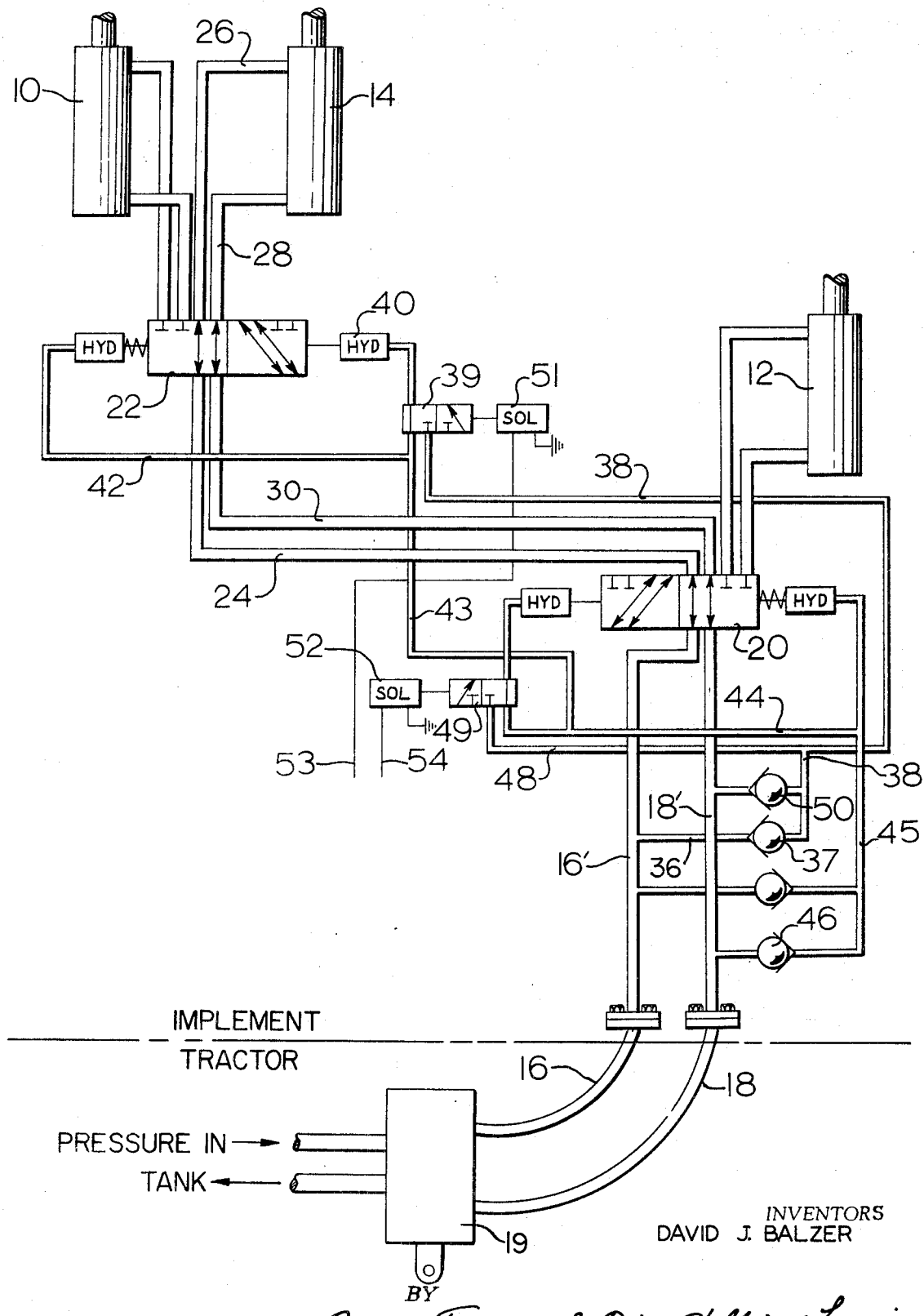

3,512,453
SYSTEM FOR ACTUATION OF HYDRAULIC MOTORS ON TRACTOR POWERED IMPLEMENTS
David J. Balzer, Tazewell County, Ill., assignor to Caterpillar Tractor Co., Peoria, Ill., a corporation of California
Filed May 22, 1968, Ser. No. 731,123
Int. Cl. F15b 11/16
U.S. Cl. 91—411                 4 Claims

ABSTRACT OF THE DISCLOSURE

The combination with a tractor and an implement powered thereby, in which the implement has hydraulic motors for adjusting some of its components, selector valves to direct pressure to the motors selectively, a pilot pressure system for actuating the selector valves, and an electrical system with solenoid valves to control the flow of pilot fluid. In this system, the pilot fluid is tapped from the main hydraulic lines on the implement and it is, therefore, necessary to have only two hydraulic lines bridging the connection between the tractor and implement, together with necessary electric conduits.

---

The components of tractor-driven implements are often driven or adjusted hydraulically. For example, a bulldozer blade may have jacks to cause it to angle, tilt or pitch, and it may have jacks to raise and lower ripper shanks, one of which is adjustably carried at each end of the blade. Similarly, rippers which are drawn behind a tractor have jacks to raise and lower the ripper shanks and to control their angle of entry into the earth. Hydraulic lines, generally in the form of flexible hoses, must cross the connection between a tractor and the implement for supplying fluid under pressure to all of these jacks. Such lines are costly and subject to a high rate of failure because of the environment in which they are used.

It is an object of the present invention to provide a system for supplying actuating fluid selectively to any one of several jacks on an implement from a pressure source on a connected tractor, with no more than two pressure lines bridging the connection between the tractor and implement. A further object is to provide a system with selector valves on the implement actuated by pilot pressure derived from the main pressure lines on the implement and selected by electrically actuated devices.

Further and more specific objects and advantages of the invention and the manner in which they are carried into practice are made apparent in the following specification by reference to the accompanying drawing.

The drawing is a schematic view of the hydraulic and electrical circuitry on a bulldozer having three separate hydraulic jacks actuated by a system embodying the present invention.

The drawing shows a circuit which includes means to tilt a bulldozer blade and means to raise and lower ripper shanks, one of which is disposed at each end of the blade. However, this is presented only as a typical arrangement since the same system may be used on other types of bulldozers or rippers, as well as various other implements.

A jack for actuating a lefthand ripper shank is shown at 10, and a jack for a righthand ripper shank at 12. A third jack 14 causes tilting of the blade, the jack being included in a diagonal strut between a push arm and one upper corner of the blade in a conventional manner. These jacks are actuated selectively from two main flexible lines 16 and 18 which lead to the hydraulic system of a tractor not shown. They connect with main lines 16′ and 18′ which may be rigid conduits secured to or within the hollow structure of the blade. The lines 16 and 18 are alternately and selectively supply and return lines, depending upon the actuation of a control valve 19 at the operator's station of the tractor, as is also conventional in the actuation of any double-acting hydraulic jack.

Fluid under pressure in either of the lines 16 or 18 may be directed selectively to any of the jacks 10, 12 or 14, and returned through the opposite lines 16 or 18 by means of two selector valves 20 and 22. The manner in which the positions of these valves is controlled will presently be described in detail. With the two valves 20 and 22 in their normal positions as shown and assuming main line 16 to be the supply line, the tilt jack 14 will be retracted by pressure from line 16′ and through valve 20, line 24, valve 22 and line 26. Simultaneously, fluid is returned from the head end of tilt jack 14 through line 28, valve 22, line 30, valve 20 and line 18′, now acting as the return line.

It is apparent, therefore, that shifting of valve 22 to the left, as viewed in the drawing, will connect the circuitry just described to the lefthand ripper jack 10 to effect its adjustment in the same manner. In both cases, the valve at the operator's station of the tractor may be adjustable to direct the supply through main line 18 and return to main line 16, causing operation of either jack in the opposite direction. To operate righthand ripper jack 12, selector valve 20 is shifted to the right, as viewed in the drawings, connecting lines 16′ and 18′ with opposite ends of the jack so that extension and retraction thereof is again controllable from the operator's station of the tractor.

Pilot pressure is employed to adjust the valves 20 and 22. When line 16′ is the supply line, pilot pressure is tapped therefrom through a line 36, check valve 37 and line 38, which leads to a valve 39 for controlling flow of fluid to a hydraulic actuator 40 which adjusts valve 22 to the left from the position shown in the drawing in opposition to its spring, the spring chamber being vented by line 42 to a low pressure return line 43 and line 44 to line 45 and return line 18′ through check valve 46. This check valve serves to prevent escape of pressure from line 18′ when it is used as the supply line. Meanwhile, pilot pressure is also directed to a valve 49 which functions identically with valve 39 to control actuating pressure to the selector valve 20, the return from the spring chamber of this valve also being through line 45. When line 18′ is the supply line, pilot pressure is supplied to valves 39 and 49 through check valve 50 and to valve 49 through a line 48 acting in the same manner as the line 38 with the valve 39.

With the valves 39 and 49 in the positions shown, pilot fluid for adjusting either of the selector valves 20 or 22 is blocked. The valves 39 and 49 are adjusted by solenoids 51 and 52, respectively, to which current is supplied through wires 53 and 54 leading to a source of electrical energy on the tractor. These valves are relatively small since they serve only to actuate a small pilot valve and are energized by closing of switches at the tractor operator's station. Such switches can conveniently be arranged on the hand lever, for example, of the valve which controls the flow of fluid through the main lines 15 and 18.

As a consequence of the system described above, several separate hydraulic motors on an implement can, through simple circuitry, be actuated from a remote tractor operator's station, with only two hydraulic conduits and one or more electric conductors bridging a connection between the tractor and the implement. An additional safety feature resides in the fact that neither the main lines between the tractor and implement nor the pilot lines are charged with pressure except when they are in use.

What is claimed is:

1. In combination with a tractor and implement powered thereby in which the implement has hydraulic motors for adjusting some of its components, a pressure source, at least one selector valve to selectively direct pressure to the motors, a pilot pressure system disposed entirely upon the implement for actuating the selector valve, and a solenoid actuated valve in the pilot system controlling flow of pilot fluid to the selector valve.

2. The combination of claim 1 in which the pilot system receives fluid under pressure from either of two lines used alternately as supply and return lines and returns fluid to the other.

3. The combination of claim 2 in which said two lines constitute the only hydraulic fluid connections between the tractor and implement.

4. The combination of claim 3 in which said two lines and the pilot system are pressurized only when one of the hydraulic motors is being actuated.

References Cited

UNITED STATES PATENTS

| | | |
|---|---|---|
| 2,615,302 | 10/1952 | Camerota. |
| 2,643,515 | 6/1953 | Harsch. |
| 2,892,312 | 6/1959 | Allen et al. |
| 3,211,065 | 10/1965 | Hunger et al. ____ 91—461 XR |
| 3,213,886 | 10/1965 | Pearne _____ 91—461 XR |

EDGAR W. GEOGHEGAN, Primary Examiner

U.S. Cl. X.R.

60—52; 91—414